(12) United States Patent
Petrovic et al.

(10) Patent No.: US 10,162,403 B2
(45) Date of Patent: Dec. 25, 2018

(54) COGNITIVE ENERGY SAVING METHOD AND APPARATUS

(71) Applicant: Entropic Communications, LLC, Carlsbad, CA (US)

(72) Inventors: Branislav Petrovic, La Jolla, CA (US); Abul Shams Safdar, San Diego, CA (US); Sagar Jogadhenu, San Diego, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 186 days.

(21) Appl. No.: 14/290,066

(22) Filed: May 29, 2014

(65) Prior Publication Data
US 2015/0293579 A1 Oct. 15, 2015

Related U.S. Application Data

(60) Provisional application No. 61/979,402, filed on Apr. 14, 2014.

(51) Int. Cl.
G06F 1/32 (2006.01)

(52) U.S. Cl.
CPC .......... G06F 1/3287 (2013.01); G06F 1/3206 (2013.01); G06F 1/3228 (2013.01); G06F 1/3231 (2013.01); G06F 1/3293 (2013.01); Y02D 10/122 (2018.01); Y02D 10/171 (2018.01); Y02D 10/173 (2018.01); Y02D 50/20 (2018.01)

(58) Field of Classification Search
CPC .............................. G06F 1/3287; G06F 1/3293
See application file for complete search history.

(56) References Cited

U.S. PATENT DOCUMENTS

| | | | | |
|---|---|---|---|---|
| 2008/0307240 | A1* | 12/2008 | Dahan | G06F 1/06 713/320 |
| 2009/0187939 | A1* | 7/2009 | Lajoie | G06Q 30/02 725/34 |
| 2009/0201082 | A1 | 8/2009 | Smith | |
| 2009/0287947 | A1* | 11/2009 | DuBose | G06F 1/28 713/323 |
| 2009/0295469 | A1* | 12/2009 | DuBose | H02M 3/156 327/544 |
| 2009/0320055 | A1* | 12/2009 | Langille | H04H 20/42 725/14 |
| 2010/0084918 | A1* | 4/2010 | Fells | H02J 5/005 307/32 |

(Continued)

OTHER PUBLICATIONS

PCT, Notification of Transmittal of the International Search Report and the Written Opinion of the International Searching Authority, or the Declaration, in international application No. PCT/US15/25502 dated Jul. 24, 2015 (14 pages).

(Continued)

Primary Examiner — Jaweed A Abbaszadeh
Assistant Examiner — Cheri Harrington
(74) Attorney, Agent, or Firm — McAndrews, Held & Malloy

(57) ABSTRACT

Systems and methods for reducing the amount of power consumed by an electronic or electrical device by using collected knowledge of the operation of the device to determine when to place the device in an ultra-low power consumption mode.

19 Claims, 8 Drawing Sheets

(56) References Cited

U.S. PATENT DOCUMENTS

| | | | | |
|---|---|---|---|---|
| 2011/0078468 A1* | 3/2011 | Ohno | ................... | G06F 1/3203 |
| | | | | 713/310 |
| 2014/0120961 A1* | 5/2014 | Buck | ...................... | H04W 4/12 |
| | | | | 455/466 |
| 2015/0028887 A1* | 1/2015 | Hanssen | .............. | G01R 21/006 |
| | | | | 324/601 |
| 2015/0303975 A1* | 10/2015 | Calhoun | .............. | H04B 1/1607 |
| | | | | 455/73 |

OTHER PUBLICATIONS

International Preliminary Report on Patentability corresponding to International Patent Application No. PCT/US2015/025502 dated Oct. 27, 2016.

* cited by examiner

COGNITIVE ENERGY SAVING METHOD AND APPARATUS

RELATED APPLICATIONS

This application claims priority benefit of U.S. Provisional Patent Application Ser. No. 61/979,402, filed Apr. 14, 2014 and entitled "Cognitive Energy Saving Method and Apparatus", which is herein incorporated by reference in its entirety.

TECHNICAL FIELD

The disclosed method and apparatus relate to power management systems and more particularly to methods and apparatus for reducing power consumption in electrical and electronic devices.

BACKGROUND

It has become increasingly important to manage power consumption in many common consumer products. Reducing power consumption is important for several reasons. For one thing, generating the power needed to operate the multitude of consumer products creates a strain on the environment. For example, the power generation plants currently used to generate electrical power needed by consumers create greenhouse gases that may be contributing to global warming.

In order to control the amount of power consumed, the governments of many countries around the world are creating programs designed to reduce the amount of energy consumed by their populations. One such program is ENERGY STAR in the US. Another is Code of Conduct in the European Union. ENERGY STAR is a U.S. Environmental Protection Agency voluntary program that helps businesses and individuals save money and protect the environment through superior energy efficiency. ENERGY STAR provides guidelines for maximum power consumption and rates products based on their ability to meet these guidelines. It is very desirable for all types of products to achieve high ratings from ENERGY STAR and the other programs around the world. Therefore, reducing power consumption is an important goal for all manufacturers of consumer electronics.

Set top boxes (STBs) are one type of consumer electronic device. STBs are devices that receive, decode, process and provide video for display on a television or other display device. Typically, a cable television service provider gives one or more set top boxes to a cable service subscriber to allow the subscriber to receive and display the content transmitted to the subscriber by the service provider. When a subscriber choices to watch content provided by the service provider (i.e., when the subscriber wants to watch television), the subscriber will tune the STB to the channel that has the desired content or search through a memory of stored content and select the desired content for viewing. Several processes are implemented in the course of receiving, decoding, processing and displaying the content. Therefore, a relatively sophisticated processor is used within the STB to perform these functions. The sophistication of the processor results in a relatively long initial "boot-up" time when the STB is first turned on. Therefore, it is desirable to keep the STB powered up at all times. However, the amount of power consumed by a STB is relatively high. Clearly, this runs counter to the goal of reducing power consumption.

In many consumer electronic products, methods for reducing the power consumption have been derived. Some of those methods include turning off particular functions when they have not been used for a prolonged amount of time. For example, many personal computers today allow a user to select power saving modes that can cause a video card or hard disk drive within the computer to enter into a reduced power consumption state. Once activity is detected, the computer will return the video card or hard disk drive back to a fully active state.

In some instances, consumer products include integrated circuit (IC) chips that perform several functions. When these functions are performed by different physical portions of the IC chip, a power saving mode can be implemented whereby particular functions within the IC chip are turned off, thus reducing the overall power consumption of the IC chip. These functions can either be turned off directly by the user placing the device in standby mode or by a timer that determines that the function has not been used for some predetermined amount of time. These functions can then be turned back on when the user makes a request for one of the functions that was turned off.

In some cases, power is not removed from the sections of the IC, but rather the function is simply inactive. Simply deactivating a function typically will reduce the amount of power consumed by the IC. However, when power is applied to the circuits of the IC, even if a particular circuit is inactive, some power will typically still be consumed. Therefore, some ICs are designed with an "always-on power island" that isolates those circuits that need to remain on from those circuits that can be turned off during periods of inactivity. Such always-on power islands allow the power to continue to be applied to those circuits responsible for the functions that need to remain on, even during inactive periods. However, the use of such an always-on power island allows power to be completely removed from those circuits that are not on the always-on island (i.e., those circuits for which power can be removed in order to conserve power and reduce power consumption during inactive periods).

A switch is used to shut off power to the non-essential circuits that do not reside within the always-on power island. The switch lies between the power structures that provide power to circuits within the always-on power island and the power structures that provide power to the circuits that are not within the always-on power island, thereby isolating the power within the always-on power island. The use of an always-on power islands provides an effective means for removing power from non-essential circuits while allowing essential circuits to remain fully powered.

Typically, when power is removed from a processor or the processor is placed in an inactive state, there is a need to save information to allow the processor to return to an active state. In some cases, it is desirable for the processor to continue operation from the state that existed within the processor when the processor was interrupted. There are several types of memory devices, each of which have certain characteristics that make them more or less desirable in different instances. Typical solid state Random Access Memory (RAM) is very fast. RAM makes information readily available to a processor. Alternatively, Flash memory provides a means for storing larger amounts of information inexpensively, but at slightly slower speeds than can typically be accomplished with RAM. Magnetic disk drives are used to store large amounts of information and have relatively slow read times.

While the use of standby modes and other techniques for deactivating non-essential circuits have reduced power consumption significantly, the desire to further reduce power consumption requires more and more efficient use of power. Therefore, even these techniques are insufficient to provide the desired reduction in power consumption. With smaller integrated circuit geometries it becomes even harder to meet low power consumption goals. This is particularly true when the geometries are below 40 nm, where the static leakage currents are high. High leakage currents increase the power consumption, even in inactive/standby modes. Accordingly, there is presently a need for methods and apparatuses that can further reduce power consumption.

SUMMARY

Various embodiments of the disclosed method and apparatus for reducing power consumption in consumer products are presented. Some of these embodiments are directed toward systems and methods for reducing the power consumed by a set top box (STB).

The processor within a STB can be used to assist with making decisions on whether to enter into an "ultra-low power consumption" (ULPC) mode. In the ULPC mode, in accordance with one embodiment, power is completely removed from all functions and components of the STB with the exception of a very low power consuming timer and a circuit that allows the timer to be overridden. When the timer times out, power is restored to the STB.

In order to determine when to enter the ULPC mode, the STB collects information regarding usage patterns of the STB and the particular power saving states that the STB enters. This information is collected over time to build a knowledge base on which power control is optimized. The information is saved in non-volatile memory to preserve the information when no power is applied to the STB.

Various criteria may be used to assist in determining when the STB should enter the ULPC mode, including time of day, day of the week, time of year, activity around the STB, such as motion, changes in lighting and sound.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
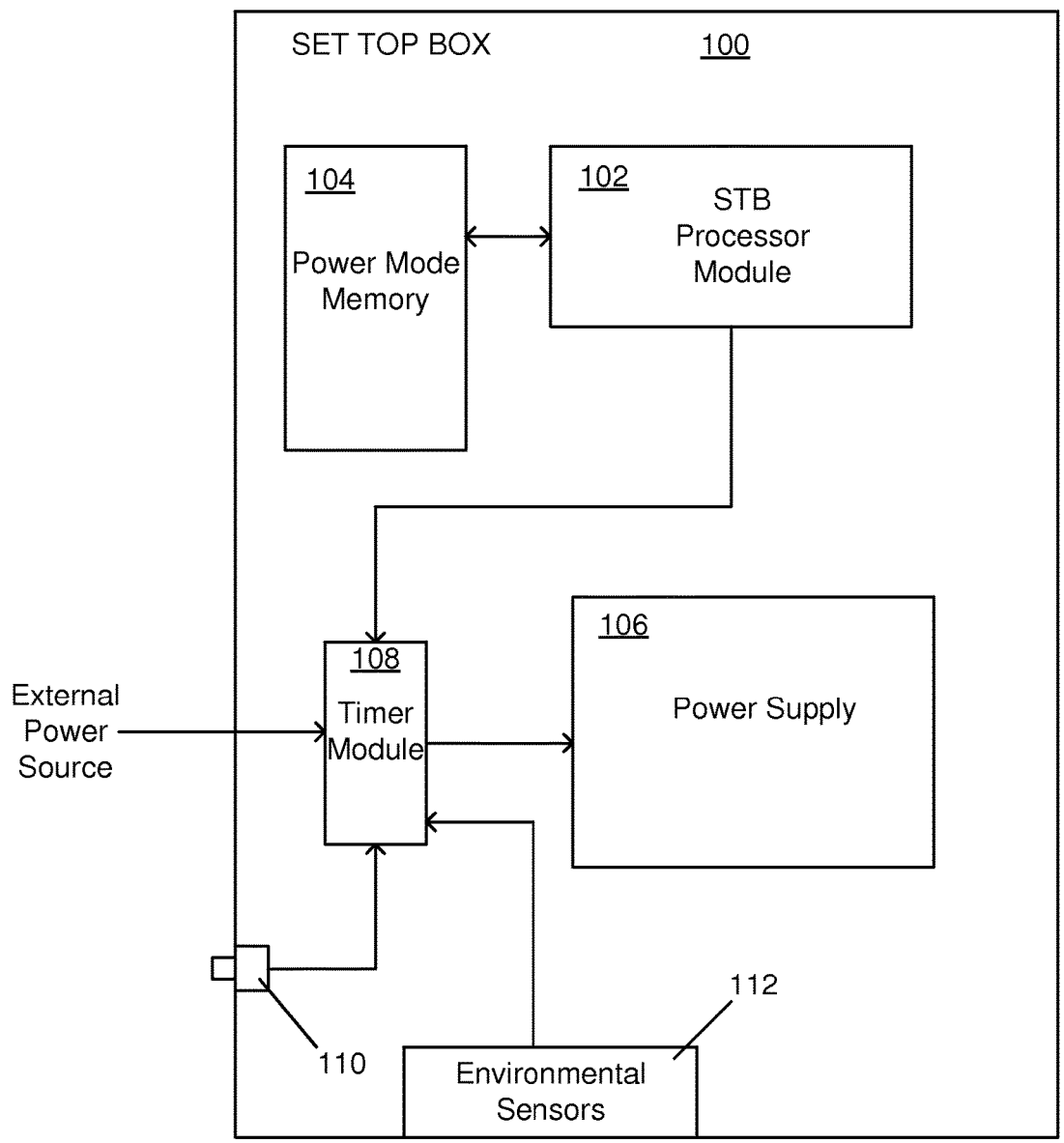
FIG. 1 is simplified block diagram of a device in accordance with one embodiment of the presently disclosed method and apparatus

FIG. 1 is a simplified block diagram of a device, such as a set top box (STB) in accordance with one embodiment of the presently disclosed method and apparatus. The STB 100 includes an STB processor module 102, a power mode memory 104, a power supply 106, a timing module 108, a front panel button 110 and one or more environmental sensors 112. In one embodiment, an External Power Source is an AC outlet connected to the STB 100 by an AC power cord. In another embodiment, the External Power Source is an AC/DC adapter connected to STB 100 by a DC cord. In one example of the disclosed method and apparatus, the STB processor module 102 collects information that is used to determine the usage patterns of the STB 100, including when the STB 100 is recording or displaying programs, when the user is providing commands to the STB 100, etc. This information may include the time of day, the day of the week and the time of the year when such activity occurs. In one embodiment the timing information (time, day, date) is generated internally in the timing module 108. In another embodiment the timing information is obtained from the system, for example from a gateway or head-end.

In one embodiment of the disclosed method and apparatus, information gathered by the STB processor module 102 is stored in a power mode memory 104. In one embodiment, the power mode memory 104 is a non-volatile memory. In another embodiment, the power mode memory 104 shares the flash memory used as a non-volatile storage to store program codes and other data used by STB 100. After collecting and storing the information in the power mode memory, the STB processor module 102 uses the information to determine times of the day, days of the week and times of the year when the STB 100 is inactive. Once the STB processor module 102 determines that STB 100 is essentially inactive at a particular time of the day, week and year, the STB processor module 102 will use this knowledge to turn off the power supply 106. Accordingly, information regarding usage patterns can be used to determine when the best times are to enter an "ultra-low power consumption" (ULPC) mode and to exit ULPC mode. In accordance with one embodiment of the disclosed method and apparatus, the power supply is turned off during ULPC mode and turned on when the STB 100 exits ULPC mode. In accordance with one embodiment of the disclosed method and apparatus, the STB processor module 102 turns off the power supply 106 by breaking the connection between the power supply 106 and the external power source. In another embodiment, the power supply 106 is turned off via a control line from the timing module 108 disabling the power supply by asserting a disable signal to the power supply's "ENABLE" pin. The timing module 108 is provided with sufficient information to allow the timing module 108 to return power (exit ULPC mode) at a time when the STB processor module 102 determines from the usage patterns that the user is likely to attempt to control the STB 100.

Figure 2:
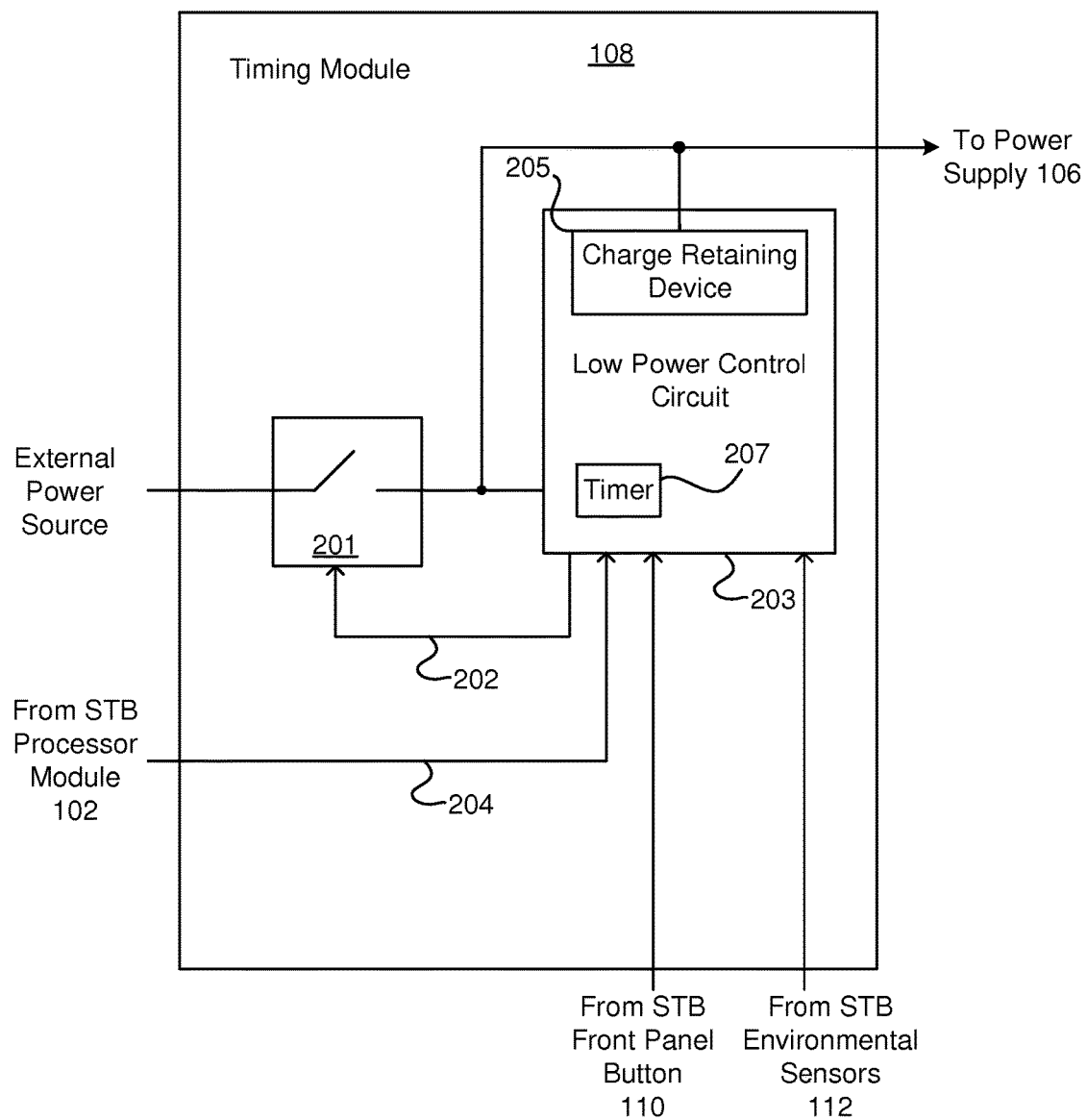
FIG. 2 is a simplified schematic of the timing module.

FIG. 2 is a simplified schematic of the timing module 108. The timing module 108 includes a switch 201 that controls the flow of power to the power supply 106. The switch 201 is controlled by a signal provided on a control signal line 202 from a low power control circuit 203. The low power control circuit 203 receives commands over command line 204 from the STB processor module 102 to open the switch 201. In accordance with one embodiment of the disclosed method and apparatus, the low power control circuit 203 includes a charge retaining device 205, such as a capacitor, that holds a charge for a predetermined amount of time. The charge in the charge retaining device 205 provides sufficient power to enable the necessary functions of the timing module 108 when the STB 100 enters ULPC mode (i.e., when the power supply is turned off). Prior to running out of charge (i.e. before the voltage drops below a predetermined threshold) the low power control circuit 203 will cause the switch 201 to close to allow the charge within the charge retaining device 205 to be restored. In addition, a timer 207 within the low power control circuit 203 begins to run when the switch 201 is opened. Once the timer 207 times out the STB 100 will exit ULPC mode (i.e., the switch 201 will be closed and power returned to the system). In an alternative embodiment, the low power control circuit 203 can be powered by a battery (not shown). In another embodiment, the low power control circuit 203 is powered from a second power supply (not shown) that may be available in the system. In accordance with one embodiment of the disclosed method and apparatus, the amount of time that will elapse before the timer 207 times out and closes the switch 201 will depend upon the usage information.

By disconnecting the power supply 106 from the external power source, there is no load placed on the external power source. Thus, the STB 100 draws no power from the external power source at all. Accordingly, the power consumption is reduced to zero for that period during which the STB processor module 102 determines that the STB 100 is likely to be inactive.

Several additional mechanisms can be provided to return power to the STB 100. For example, the front panel button 110 of the STB 100 can be pressed to activate a switch and cause the timing module 108 to close the switch 201 and return external power to the power supply 106. In one embodiment, the state of one or more environmental sensors 112 are monitored by the low power control circuit 203. The state of the environmental sensors 112 is used to detect the likelihood that the STB 100 will need to be powered on (e.g., that a user is likely to attempt to use the STB 100). In one embodiment of the disclosed method and apparatus, detecting the presence of a user near the STB 100 is one way in which the environmental sensors 112 can detect that it is likely that the STB 100 will need to be powered on. If the presence of a user is detected, the environmental sensor(s) provide a signal to the timing module 108 that will cause the switch 201 within the timing module 108 to close, thus returning external power to the STB 100 (i.e., turning the power supply back on).

In yet another alternative embodiment, ULPC mode can be toggled on and off according to a predetermined programmed schedule devised based upon the usage patterns and/or goals for power consumption. For example, a duty cycle can be established that increases the chances that regulatory requirements are met. The duty cycle can be adjusted based on measurements of whether the regulatory requirements are likely to be met. If it appears that such goals will not be met, the STB processor module 102 can use a more aggressive select process to determine times at which it is unlikely that the user will attempt to use the STB 100. That is, if particular power consumption goals for a particular period of time have not been met or are not likely to be met using the current criteria for entering ULPC mode, the criteria for entering ULPC mode can be adjusted to make it more likely that the goals will be achieved. For example, the criteria used to determine whether a user is likely to use the STB 100 can be made more aggressive so that the STB 100 is more likely to enter ULPC mode.

In some embodiments, if the switch 201 is not connected to the external power source (or if the external power source provides no power) when the switch 201 attempts to reconnect the power supply 106 to the external power source, the event can be recorded within the low power control circuit 203. Once the switch 201 is reconnected to the external power source, the front panel button 110 may need to be pressed to close switch 201 and reconnect the power supply 106 to the external power source. In one embodiment of the disclosed method and apparatus, the low power control circuit 203 detects when an external power source has been reconnected to the STB 100. Upon detecting that the external power source has been reconnected, the low power control circuit 203 turns the power supply back on. In one embodiment the low power control circuit 203 closes switch 201 to turn the power supply 106 back on. In an alternative embodiment, when the power returns from external power source, the low power control circuit 203 turns the power supply 106 back on by sending a control signal to an enable port of the power supply 106. This will remove the need for the user to press the front panel button 110 when the STB 100 has been disconnected from external power for an extended amount of time (such as if the STB 100 has been unplugged from a wall outlet for an extended period).

Figure 3:
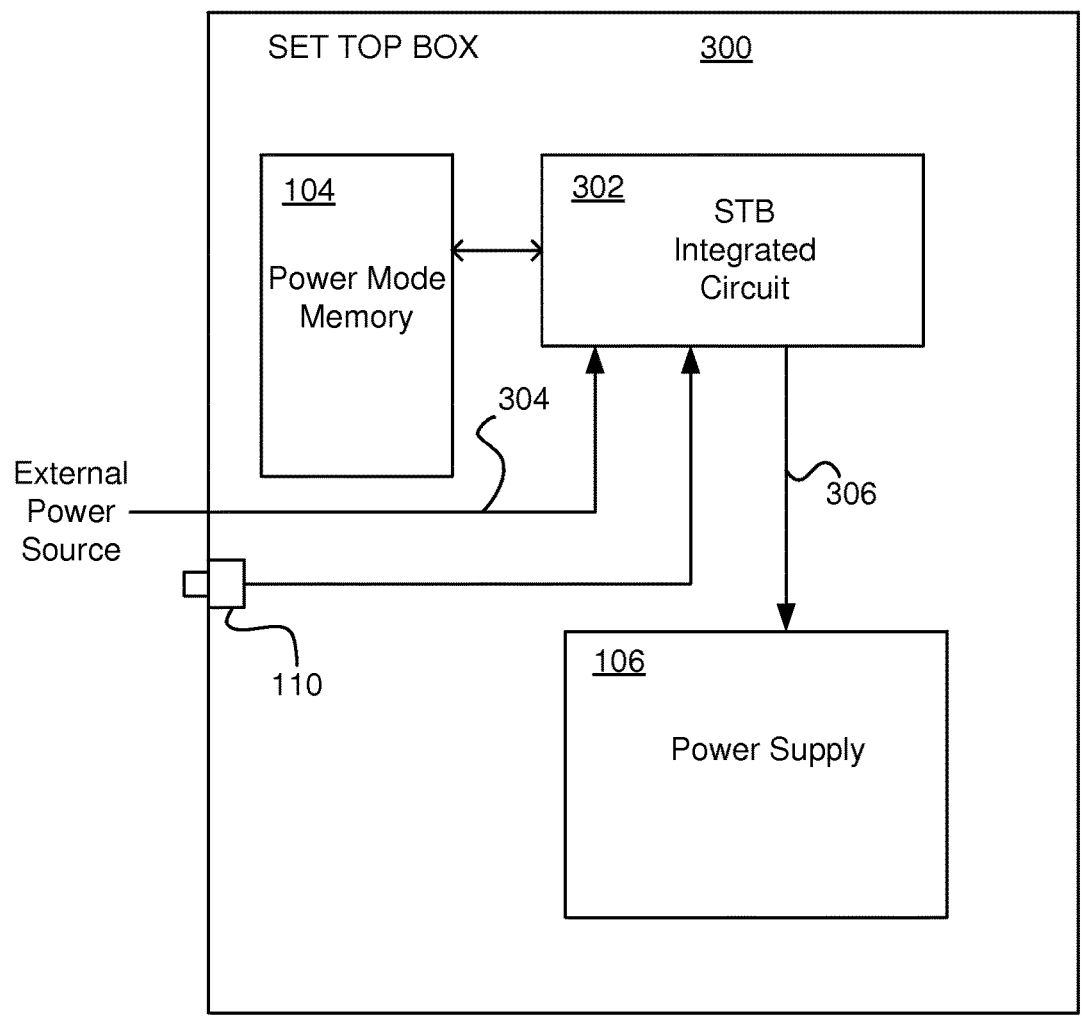
FIG. 3 is an illustration of an embodiment of a device having an integrated circuit that controls entry into an ultra-low power consumption mode in accordance with one embodiment of the disclosed method and apparatus.

FIG. 3 is an illustration of an embodiment of a STB 300 having a STB integrated circuit 302. A power mode memory 104, similar to that disclosed with respect to the STB 100 shown in FIG. 1, provides storage for storing information regarding usage patterns, etc. A user accessible button 110, similar to that shown in FIG. 1, provides a means by which the user can directly command the STB 300 to exit ULPC mode. In one embodiment of the disclosed method and apparatus, the STB integrated circuit 302 provides a connection between a power supply 106, similar to the power supply shown in FIG. 1, and an external power source to allow the STB integrated circuit 302 to turn the power supply 106 on and off. The STB integrated circuit 302 receives power from an external power source via a connection 304. In accordance with this embodiment, the STB integrated circuit 302 controls whether the STB 300 enters ULPC mode.

In one embodiment, when the STB 300 is in ULPC mode, the STB integrated circuit 302 provides power from the external source through to the power supply 106 over the power line 306. In the embodiment shown in FIG. 3, the STB 300 has no independent capability to control the power supply 106. Therefore, the STB integrated circuit 302 controls whether the STB 300 enters and exits ULPC mode.

Figure 4:
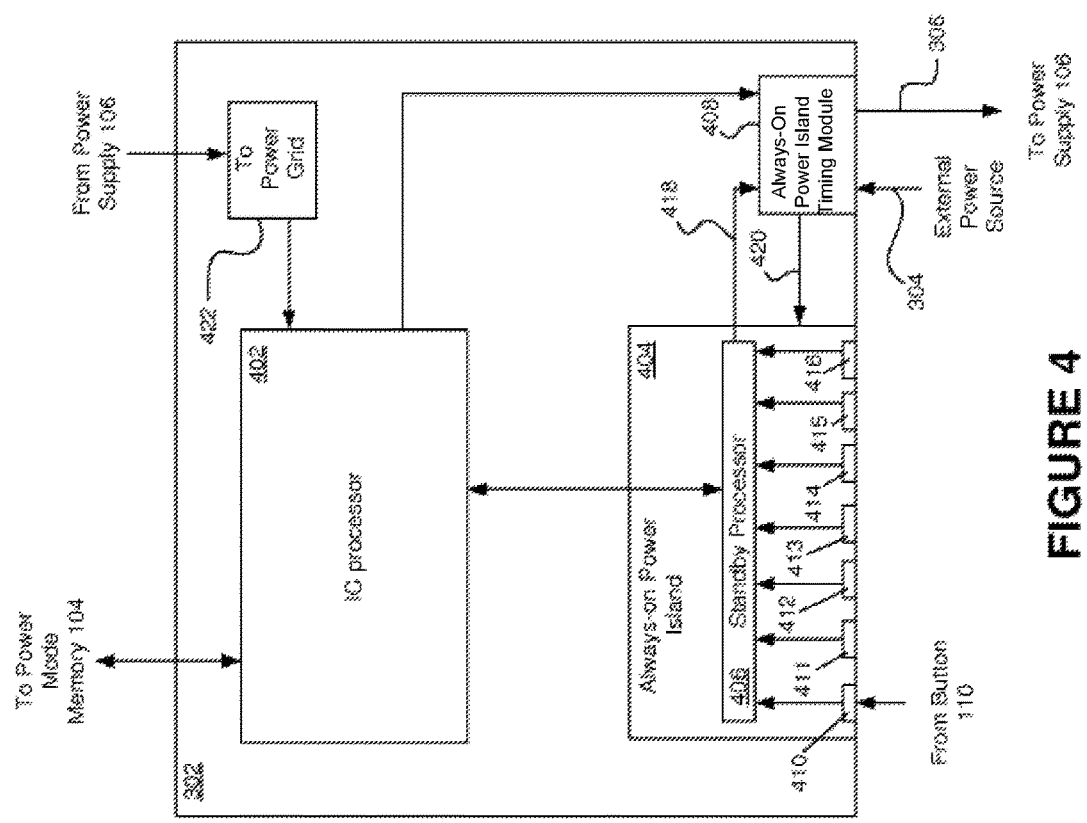
FIG. 4 is a simplified block diagram of an integrated circuit in accordance with one embodiment of the disclosed method and apparatus.

FIG. 4 is a more detailed illustration of an embodiment of the STB integrated circuit 302 in accordance with one embodiment of the presently disclosed method and apparatus. The STB integrated circuit 302 includes an integrated circuit (IC) processor 402, a timing module 408 and an always-on power island 404. The always-on power island 404 includes a standby processor 406 and seven interface modules 410-416. Signals 418 from the always-on power island 404 are coupled to the timing module 408. These signals 418 include the state of environmental sensors coupled to the interface modules 410-416.

When the power supply 106 is on (i.e., capable of supplying power), power is coupled from the output of the power supply 106 to a power grid 422 that distributes the power throughout the STB integrated circuit 302 with the exception of the always-on power island 404 and the timing module 408, which are isolated from the power grid 422.

The always-on power island is an area of the integrated circuit 302 in which the power supply to that portion of the integrated circuit can be isolated from the power supply to the rest of the integrated circuit. In accordance with one embodiment of the disclosed method and apparatus, power is supplied to the always-on power island 404 by the charge retaining device 205 within the timing module 408 over a power line 420. Therefore, power can be maintained within the always-on power island 404 while being completely removed from the other areas of the integrated circuit 302. The timing module 408 is formed within a second power island. In one embodiment of the disclosed method and apparatus, the timing module 408 is also powered by the charge retaining device 205. Accordingly, power can be applied to the timing module 408 without applying power to any other circuits in the integrated circuit 302.

The IC processor 402 collects information about when the STB 300 is being used, for what purposes the STB 300 is being used and the time and duration of the power states the STB 300 used (i.e., usage patterns). This information is then used to determine when to enter an ULPC mode within the integrated circuit 302.

When the IC processor 402 determines that it is appropriate for the integrated circuit 302 to enter ULPC mode, the IC processor 402 provides a command to the timing module 408 to start counting down. Power is then removed from everything in the integrated circuit 302 except for the timing module 408 and the always-on power island 404 causing the STB 300 to enter ULPC mode. When the timer times out, the STB 300 will exit ULPC mode. In one embodiment, all seven of the interface modules 410-416 remain active. Each interface module 410-416 is coupled to an environmental sensor. The first interface module 410 interfaces with a general purpose input/output (GPIO) of the processor 406 via a button 110 that the user can directly actuate. The second interface module 411 interfaces with an infra-red sensor (not shown), such as that used to receive commands from a remote control device. The third interface module 412 interfaces with a motion sensor (not shown) that can detect motion in the area around the STB. The fourth interface module 413 interfaces with a sound sensor (not shown). The fifth interface module 414 interfaces with a light sensor (not shown). The sixth interface module 415 interfaces with a remote control radio frequency sensor/receiver (not shown). The seventh interface module 416 interfaces with a local area network (LAN) (not shown) such as MoCA, Ethernet, WiFi.

More interface modules can be added to respond to multiple LAN lines. Each of these interfaces require a varying amount of power when operational. Therefore, in an alternative embodiment, each of the interface modules 410-416 is placed into a power island by itself so that it can be turned on or off based on the analysis and selection criteria used by the IC processor 402 to determine the appropriate functions that should remain available in ULPC mode. In another embodiment, the interface modules 410-416 can be grouped together into small groups that are related, such as having the motion, sound and light interface modules 412-414 grouped together in one power island.

Figure 5:
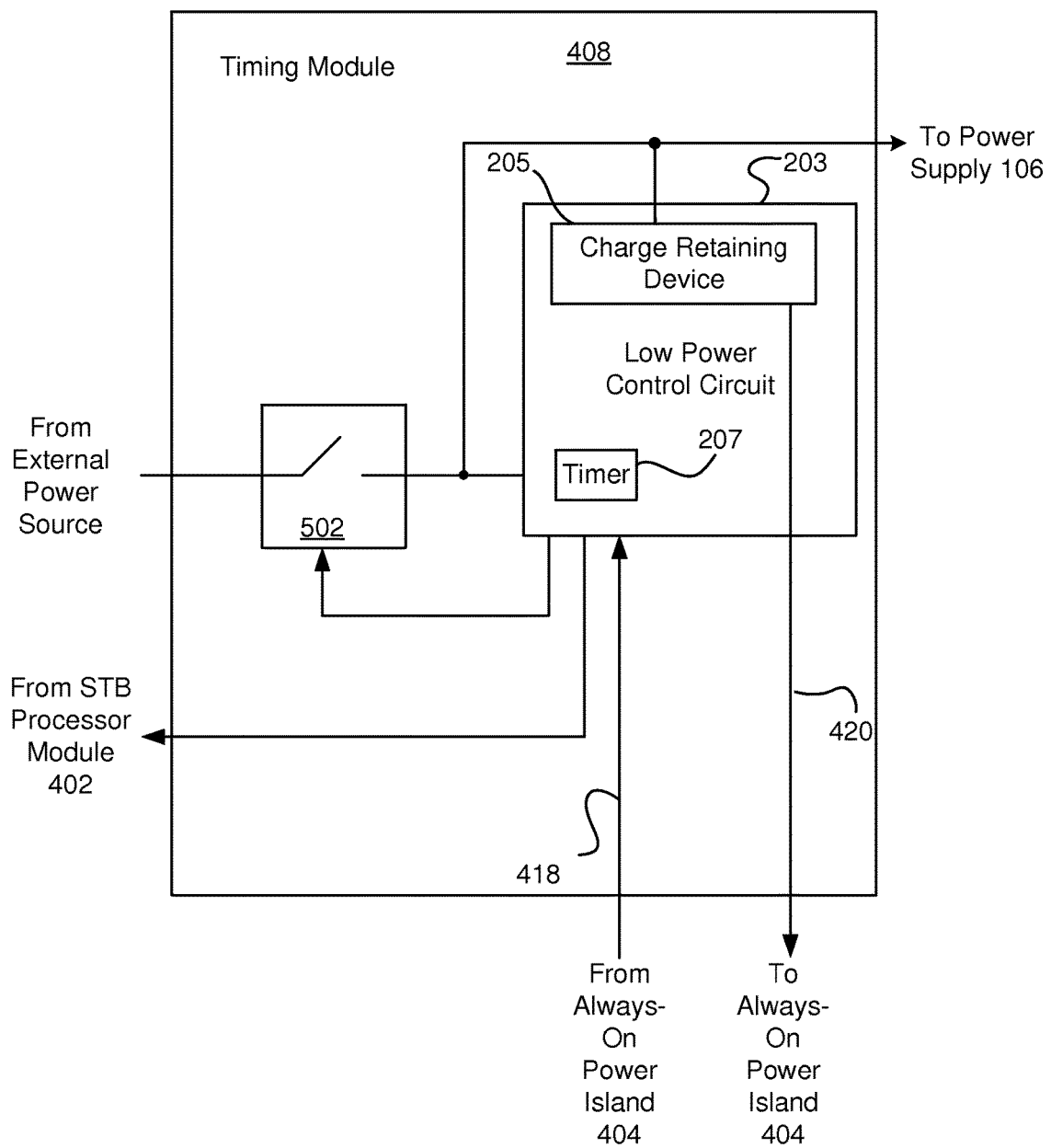
FIG. 5 is a simplified schematic of a timing module used in the device of FIG. 3 in accordance with one embodiment of the disclosed method and apparatus.

FIG. 5 is a simplified block diagram of the timing module 408. The timing module 408 operates essentially the same as the timing module 108 described with regard to FIG. 2. However, the timing module 408 within the STB integrated circuit 302 has a switch 502 that controls the connection between the power supply 106 and the power grid 422 of the STB integrated circuit 302 (see FIG. 4) rather than the switch 201 of FIG. 2. The power grid 422 provides power to those circuits that are not included within the always-on power islands 404, 408. In addition, the connections 418 to the environmental sensors and the user actuated button 110 are made through the interface modules 410-416 on the always-on power island 404.

One consideration to be taken into account when determining how and when to put a STB into a lower power mode is the desire to have the STB react quickly to user input (i.e., to have a rapid boot time). In one embodiment, a "suspend to RAM" architecture is used that stores in RAM all of the information necessary to bring the processors back to life. The use of RAM rather than in slower flash memory provides faster recovery to fully active mode. However, those skilled in the art will understand that ensuring the STB 300 is not in ULPC mode will significantly speed up the response of the STB 300 to user commands. Therefore, using the usage patterns detected over time will allow the IC processor to make intelligent decisions as to how long to keep the STB integrated circuit 302 in ULPC mode.

In accordance with the presently disclosed method and apparatus, the STB integrated circuit 302 may be used in either the STB 300 previously disclosed or in an STB that has an independent ULPC mode capability.

Figure 6:
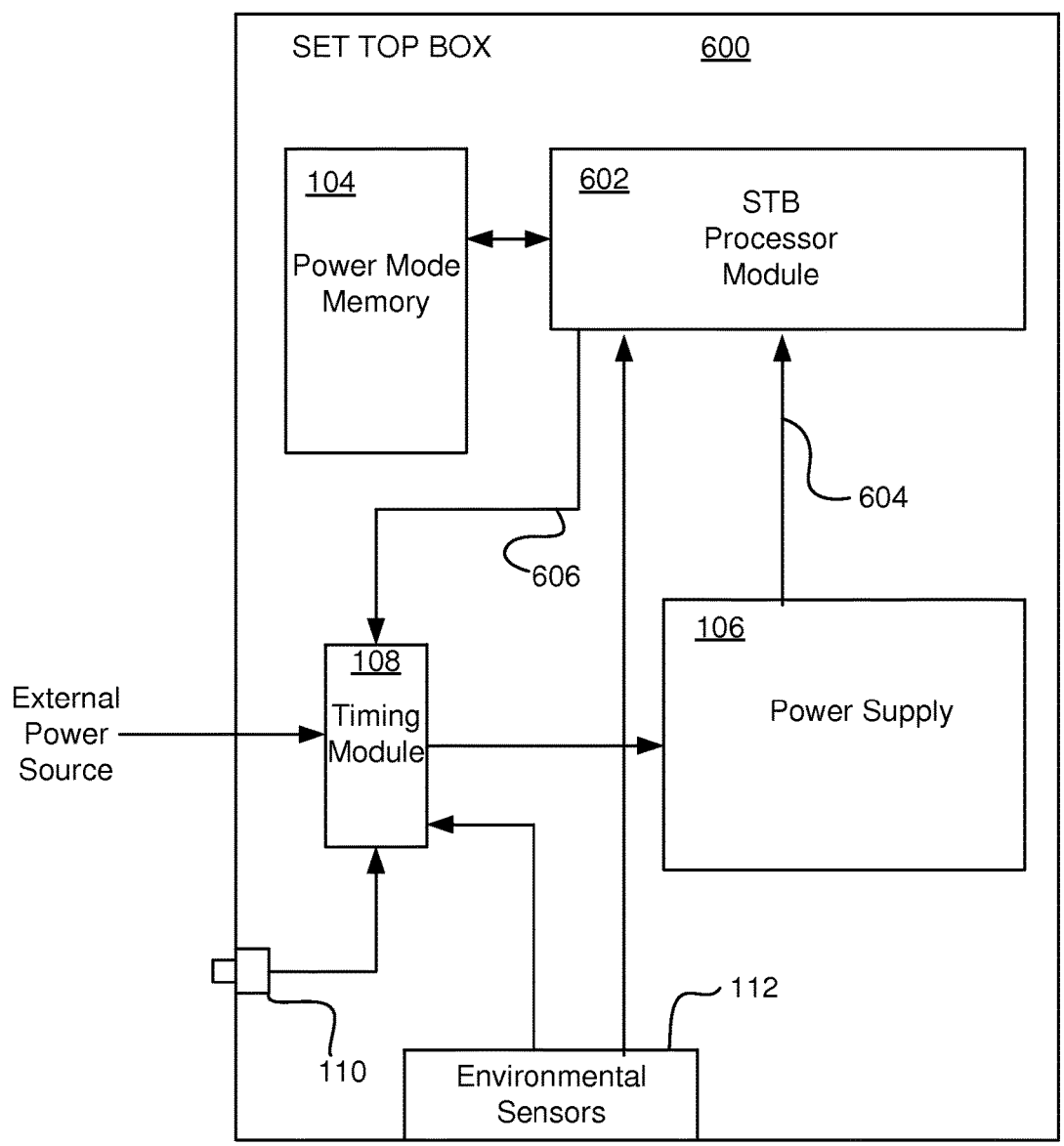
FIG. 6 is a simplified block diagram of a device that has the capability to enter an ULPC mode independently from the ULPC mode of the device integrated circuit.

FIG. 6 is a simplified block diagram of a STB 600 that has the capability to enter an ULPC mode independently from the ULPC mode of the STB integrated circuit. The STB 600 has a power mode memory 104, timing module 108, user accessible button 110, environmental sensors 112 and power supply 106, each similar to that shown in FIG. 1. In addition, the STB 600 has a STB processor module 602.

Figure 7:
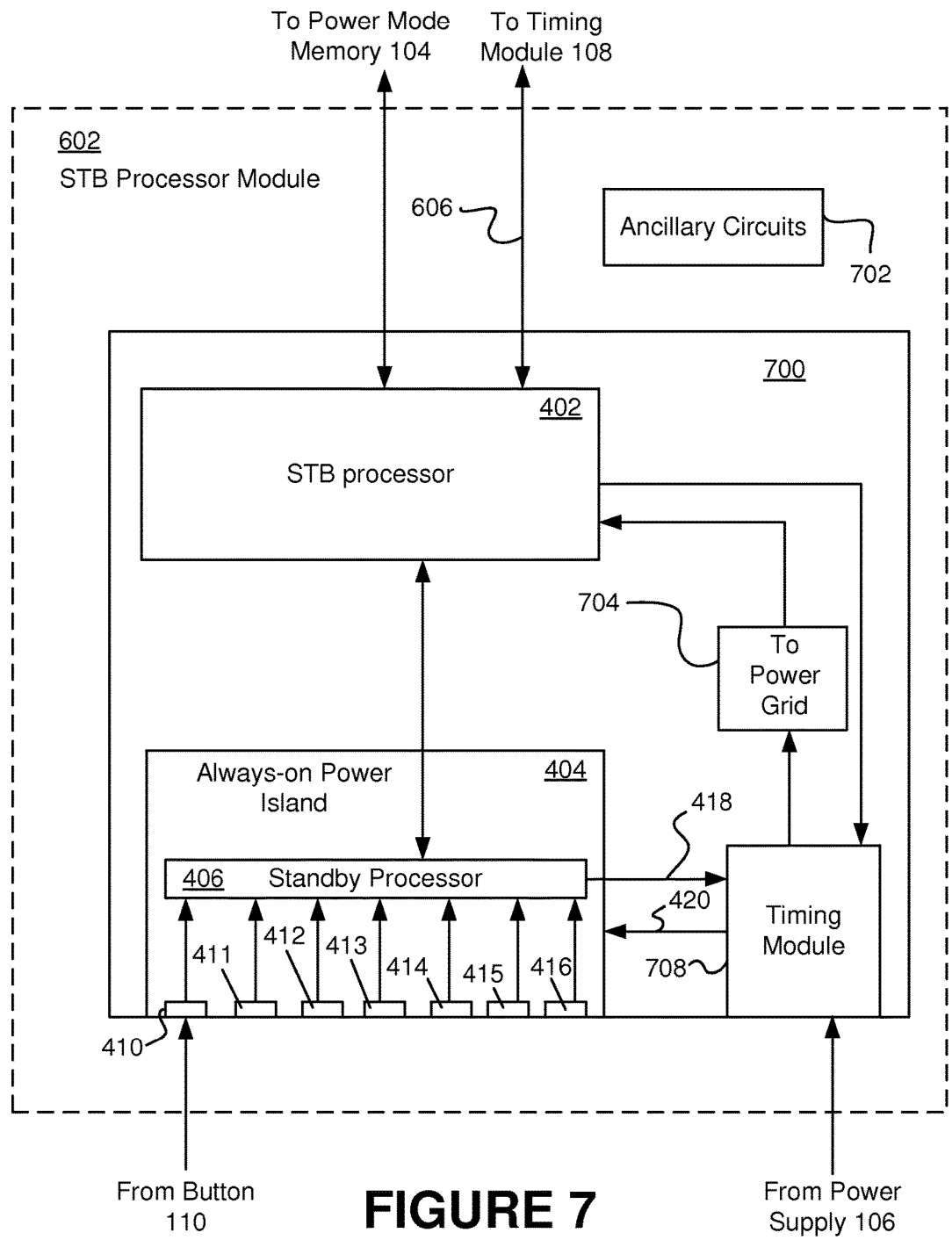
FIG. 7 is a simplified block diagram of the processor module used in the device shown in FIG. 6.

FIG. 7 is a simplified block diagram of the STB processor module 602 used in the STB 600. The STB processor module 602 includes an STB integrated circuit 700 and ancillary circuits 702. The ancillary circuits are those circuits that perform various tasks associated with the STB generally. These particular tasks are not necessarily relevant to the presently disclosed method and apparatus, but rather, are merely ancillary.

The STB integrated circuit 700 is essentially the same as the STB integrated circuit 302 described above with respect to FIG. 4. Accordingly, the STB integrated circuit 700 includes an IC processor 402 and an always-on power island 404, each essentially the same as described above with respect to the STB integrated circuit 302. However, since the STB integrated circuit 700 can enter ULPC mode independently from the STB 600, the timing module 708 is configured slightly differently. In addition, the IC processor 402 within the STB integrated circuit 700 is coupled by signal line 606 to the timing module 108 (see FIG. 6). The IC processor 402 determines when to place the STB 600 in ULPC mode based on usage pattern information. The IC processor 402 provides control signals to the timing module 108 to load the timer and control the times at which the timing module 108 will open and close the switch 102 (see FIG. 2) and thus place the STB 600 in ULPC mode. It should be noted that the STB integrated circuit 302 has second timing module 708 that is independent of the timing module 108 shown in FIG. 6 and detailed in FIG. 2.

Figure 8:
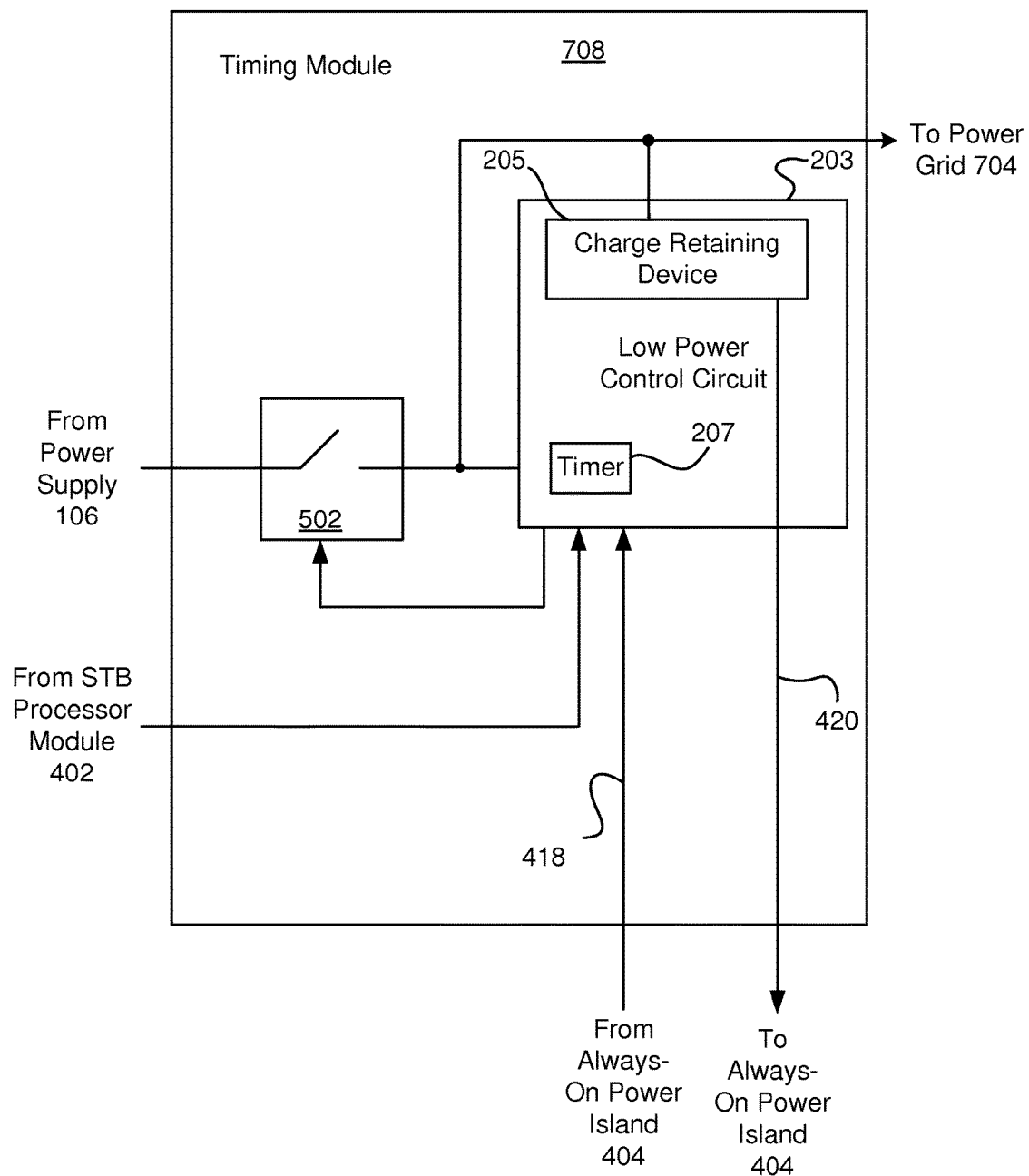
FIG. 8 is a simplified block diagram of the timing module configured to be used in a device in which an integrated circuit and the device can each independently enter and exit ULPC mode.

FIG. 8 is a simplified block diagram of the timing module 708 configured to be used in a device, such as a STB 600, in which an integrated circuit and the device can each independently enter and exit ULPC mode. The timing module 708 is essentially the same as the timing module 408. The difference between the timing module 408 and the timing module 708 is that the switch 802 in the timing module 708 connects and disconnects the output of the power supply 106 to and from the power grid 704 of the STB integrated circuit 700.

By the STB integrated circuit 302 having independent ULPC mode from the STB 600, the STB integrated circuit 302 can be in ULPC mode while the STB 600 continues to operate in another power mode. In one embodiment, the STB integrated circuit 302 is within the STB processor module 602. In one such case, the STB integrated circuit 302 collects information regarding the operation of the STB 600 (i.e., usage patterns). The Usage patterns are used to determine both whether to enter ULPC mode for the STB 600 and also whether to enter ULPC mode within the integrated circuit 302. It should be noted that in the case in which the STB integrated circuit 302 is used in a STB 600 having independent ULPC mode capability, when the STB integrated circuit 302 enters ULPC mode, the timing module 408 will cut power only to the circuits within the STB integrated circuit 302. The external power source will remain connected to the power supply 106 to allow the rest of the STB 600 to receive power (unless that STB 600 has independently entered ULPC mode).

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for communication, the system comprising:
a set-top-box comprising:
a power supply within the set-top-box;
a first timing module comprising a first switch and low power control circuit comprising a charge retaining device;
power mode memory; and
an integrated circuit in the set-top-box, the integrated circuit comprising a processor, said processor configured to collect, in the power mode memory, information regarding usage patterns of the set-top box, wherein:
the charge retaining device and the power supply are connected in parallel to an external power source via the first switch;
the low power control circuit is operable to control the first switch to control when the set-top-box enters and exits an ultra-low power control (ULPC) mode, wherein the control of the first switch is based on the information regarding the usage patterns in the power mode memory; and
the low power control circuit recharges the charge retaining device using the external power source via said first switch;
a standby processor in an always-on power island, the standby processor coupled to the processor, which is powered down when the set-top-box enters said UPLC mode and is powered up when the set-top-box exits the ULPC mode, the standby processor coupled to a plurality of interface modules that are integrated into different power islands and operable to receive inputs from a source external to the set-top-box during the ULPC mode; and
a second timing module independent of the first timing module and coupled to the processor and the standby processor, said second timing module for controlling the coupling of the power supply to the integrated circuit.

2. The system of claim 1, wherein the charge retaining device is configured to maintain sufficient power when the power supply is turned off to power functions of the low power control circuit.

3. The system of claim 2, wherein the first timing module is configured to generate the information regarding the usage patterns.

4. The system of claim 1, wherein the information regarding the usage patterns is generated in a head-end external to the set-top-box.

5. The system of claim 1, wherein the information regarding the usage patterns is generated in a gateway external to the set-top-box.

6. The system of claim 1, wherein the power supply has an enable input which allows the power supply to be turned off during operation in the ULPC mode.

7. The system of claim 1, wherein the charge retaining device is a capacitor.

8. The system of claim 1, wherein the charge retaining device is a battery.

9. The system of claim 1, wherein the low power control circuit is configured to provide a control signal to turn the power supply on to restore a charge in the charge retaining device before the charge in the charge retaining device drops to a level that is no longer sufficient to power the functions of the low power control circuit.

10. The system of claim 1, wherein:
the set-top-box comprises a second power supply; and
the low power control circuit is powered by the second power supply.

11. The system of claim 1, wherein:
the low power control circuit comprises a timer; and
the control of the first switch is based on a state of the timer.

12. The system of claim 1, wherein:
the set-top-box comprises a user-activated switch that is coupled to the low power control circuit, and that is configured to, when activated by a user, cause the low power control circuit to turn the power supply back on.

13. The system of claim 1, wherein:
the low power control circuit is configured to monitor a state of at least one environmental sensor; and
the control of the first switch is based on the state of the at least one environmental sensor.

14. The system of claim 1, wherein the control of the first switch is based upon probability of achieving particular predetermined power consumption goals.

15. The system of claim 3, wherein the first timing module is configured to record, in the power mode memory, failed attempts to turn the power supply on.

16. The system of claim 15, wherein the first timing module is configured to detect when the external power source has been reconnected to the set-top-box, and to turn the power supply on upon detecting that the external power source has been reconnected to the set-top-box.

17. A device comprising:
a power supply;
an integrated circuit comprising:
a power grid;
a power mode memory;
a processor configured to:
collect, in the power mode memory, information regarding usage patterns of the device; and
determine, from the usage patterns, when the integrated circuit is to enter an ultra-low power control (ULPC) mode;
a first always-on power island isolated from the power grid, the first always-on power island including a standby processor, the standby processor coupled to a plurality of interface modules that are integrated into different power islands and operable to receive inputs from a source external to the set-top-box during the ULPC mode; and
a first timing module residing on a second always-on power island isolated from the first always-on power island and the power grid, wherein:
the first timing module comprises a first switch that is configured to disconnect the power grid from the power supply when the integrated circuit enters the ULPC mode, and reconnect the power grid to the power supply when the integrated circuit exits the ULPC mode;
the first timing module is coupled to the processor;
the first timing module is configured to receive signals from the processor to enter the ULPC mode;
the first timing module comprises a first timer set by the processor to determine an amount of time the integrated circuit will remain in the ULPC mode;
the first timing module is coupled to the standby processor;
the first timing module is configured to receive a signal from the standby processor to exit the ULPC mode prior to the first timer timing out;
the first timing module comprises a first charge retaining device;
the processor is powered down by the first timing module when the integrated circuit enters the ULPC mode and is powered up when the integrated circuit exits the ULPC mode;
the first timing module is configured to receive power from the first charge retaining device during operation in the ULPC mode;
the first timing module recharges the charge retaining device using the power supply when the integrated circuit is in the ULPC mode; and the first always-on power island is configured to receive power from the first charge retaining device during operation in the ULPC mode; and a second timing module independent of the first timing module and coupled to the processor, said second timing module for controlling the coupling of an external power source to the power supply.

18. The device of claim 17, the second timing module comprising:

a second switch coupled to the power supply for turning the power supply on and off; and a low power control circuit, the low power control circuit having a second timer and a second charge retaining device, the low power control circuit coupled to the processor and receiving from the processor a ULPC control signal, the low power control circuit coupled to the second switch and providing a switch control signal to the second switch to cause the second switch to turn the power supply off in response to the ULPC control signal, and providing the switch control signal to the second switch to turn the power supply on in response to the second timer;

wherein the processor determines when to send the ULPC control signal to the low power control circuit based on the information regarding usage patterns.

19. The device of claim 17, the first always-on power island further including a plurality of interface modules, each interface module monitoring one or more of environmental sensors, the interface module sending a signal to the standby processor when a state of one of the one or more environmental sensors changes, and the standby processor sending a signal to the first timing module to exit the ULPC mode when the state of the one of the one or more environmental sensors changes.

* * * * *